March 21, 1939.  E. O. ROGGENSTEIN  2,151,232
PORTABLE UNIVERSAL ELECTRIC PUNCH
Filed Sept. 22, 1936   9 Sheets-Sheet 1

Fig. 1

INVENTOR.
Edwin Otto Roggenstein
BY
ATTORNEYS

March 21, 1939.  E. O. ROGGENSTEIN  2,151,232
PORTABLE UNIVERSAL ELECTRIC PUNCH
Filed Sept. 22, 1936  9 Sheets-Sheet 2

INVENTOR.
Edwin Otto Roggenstein
BY
ATTORNEYS

March 21, 1939.  E. O. ROGGENSTEIN  2,151,232
PORTABLE UNIVERSAL ELECTRIC PUNCH
Filed Sept. 22, 1936   9 Sheets-Sheet 3

INVENTOR.
Edwin Otto Roggenstein
BY Darby & Darby
ATTORNEYS

March 21, 1939.  E. O. ROGGENSTEIN  2,151,232
PORTABLE UNIVERSAL ELECTRIC PUNCH
Filed Sept. 22, 1936  9 Sheets-Sheet 6

INVENTOR.
Edwin Otto Roggenstein
BY Darby & Darby
ATTORNEYS

March 21, 1939.  E. O. ROGGENSTEIN  2,151,232
PORTABLE UNIVERSAL ELECTRIC PUNCH
Filed Sept. 22, 1936  9 Sheets—Sheet 7

INVENTOR.
Edwin Otto Roggenstein
BY
Darby & Darby
ATTORNEYS

March 21, 1939. E. O. ROGGENSTEIN 2,151,232
PORTABLE UNIVERSAL ELECTRIC PUNCH
Filed Sept. 22, 1936 9 Sheets-Sheet 9

INVENTOR.
Edwin Otto Roggenstein
BY
Darby & Darby
ATTORNEYS

Patented Mar. 21, 1939

2,151,232

UNITED STATES PATENT OFFICE 2,151,232

PORTABLE UNIVERSAL ELECTRIC PUNCH

Edwin Otto Roggenstein, Ilion, N. Y., assignor to Remington Rand, Inc., New York, N. Y., a corporation of Delaware Application September 22, 1936, Serial No. 101,903

29 Claims. (Cl. 164—113)

This invention relates to portable universal electric punches. Electrical punches have heretofore been used for punching cards for mechanical accounting systems, such cards being used in sorters and tabulators in connection with such systems. These punches of portable size have heretofore all been designed for operation from direct current. When a source of direct current power is available the machine may be a small portable device. When direct current is not available, however, it is necessary to provide some sort of rectifier. One manner in which this has been done has been to use a motor generator from which a single machine or a number of machines may be operated. Such a motor generator is, of course, a large, heavy and expensive piece of equipment, and substantially increases the cost of punching cards.

At the present time no rectifier has ever been designed for use with a punch which will supply a high enough voltage so that the current will be low enough for efficient operation, which is small and light enough to be built into the punch so that the punch and rectifier combined are portable. It has also been impossible to build a portable dry rectifier into a punch for the same reason, that is, so many sections of rectifier are required in order to have a high enough voltage and to provide an adequate margin of safety for satisfactory operation, that such a rectifier would be very large, heavy, and cumbersome and could not be included with the punch as a portable device. It has also been impossible to build a practicable punch with an alternating current magnet.

The practice where the source of power is alternating current has, therefore, heretofore always been to provide a separate rectifier which is made stationary, and to use punches within a limited distance from such rectifier.

An object of the invention is to provide a portable universal electric key punch, that is, one which will operate on either alternating or direct current, and which will be much lighter and occupy much less space than punches which are now used for performing the same functions from alternating current.

A feature of the invention is the provision of a dry disc rectifier which is assembled in such a manner as to provide an adequate source of direct current for the operation of the machine from either an A. C. or D. C. power source.

Another feature of the invention is the provision of an electrical circuit in connection with such a dry rectifier which will permit the operation of a key punch from alternating or direct current.

Another feature of the invention is the provision of an alternative circuit which may be used for A. C. or D. C. operation by the manipulation of a switch depending on which source of power is supplied, and which with D. C. current will operate with either polarity of current applied to the terminals of the circuit.

Another feature of the invention is the provision of another alternative circuit which may be used for A. C. or D. C. operation, which will operate for D. C. with either polarity of current applied to the terminals, and which requires no switching operation for change from A. C. to D. C. or vice versa.

Another feature of the invention is the provision of mechanical means for simultaneously breaking both the circuit supplying current from the power source and the circuit supplying reduced voltage current to the machine, by the operation of the machine itself.

Another feature of the invention is the provision of a combination of apparatus and circuit therefor which permits the operation of a power punch on intermittent D. C. current.

Another feature of the invention is the provision of the novel rectifier arrangements referred to above, as well as others to be described below, for whatever uses their operating characteristics are suitable.

Other objects and features of the invention will be apparent from the following description of the drawings, in which

Figure 12 is a circuit diagram showing one circuit which I use in my machine and showing diagrammatically my new rectifier assembly;

Similar parts have the same reference numerals throughout the drawings.

The essential parts of an electric key punch such as is now in commercial use will first be described, following which I will describe my new structure and circuits, and their cooperation with such parts.

Figure 1:
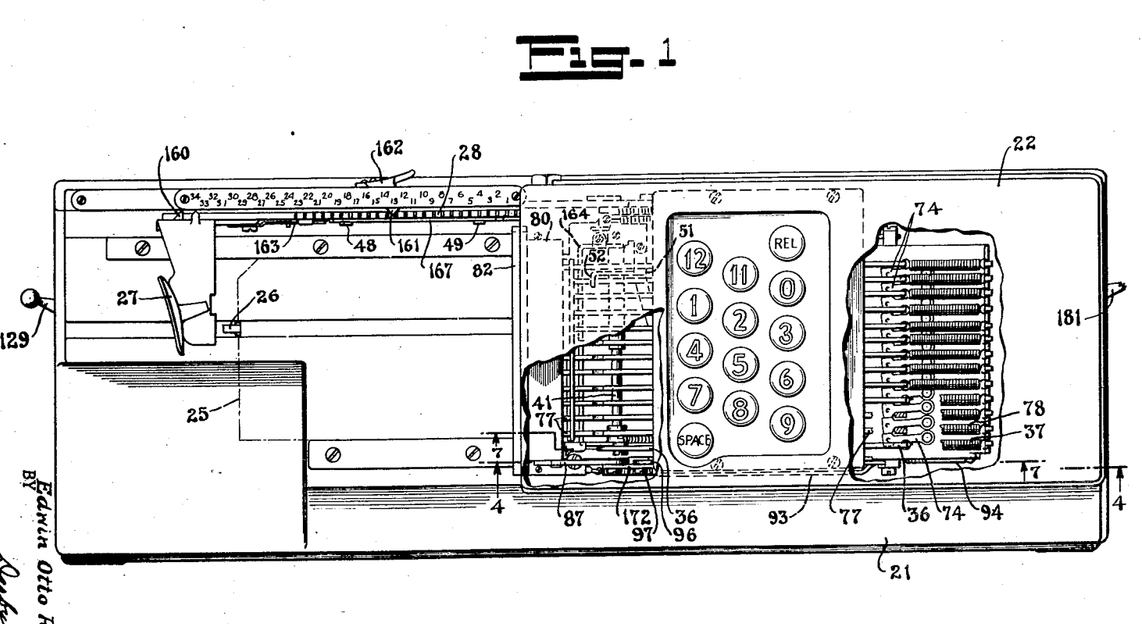
Figure 1 is a plan view, partly broken away, of my new device.
Figure 10:
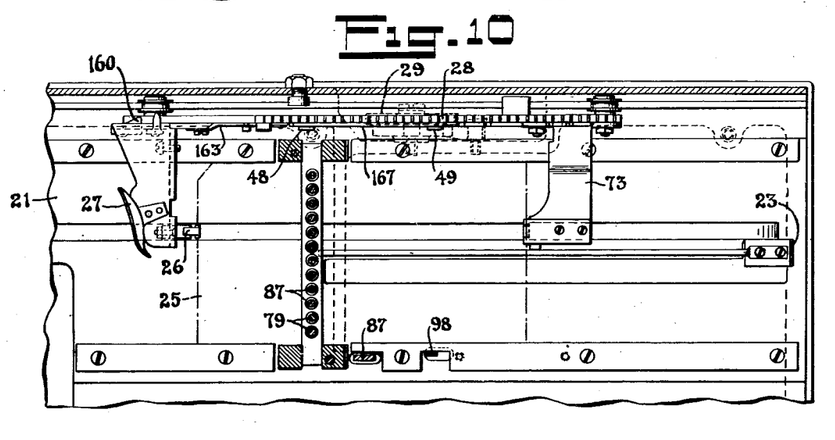
Figure 10 is a plan view along the line 10—10 of Figure 7.

My punch is mounted on a hollow base 21 and is provided with a cover 22 which may be latched in position by means of latch 23 and button 24. In Figure 1 I show a card 25 inserted in position and held by a card latch 26 ready to be pushed to the right to its starting position under the punches by means of the carriage handle 27. In Figure 10 the carriage is shown partly pushed over, with the carriage stop 160 in engagement with the margin stop 161 (Figure 1) and the card 25 advanced to the right to its starting position for the position set by the margin stop adjusting mechanism 162. A pointer on the carriage cooperates with a scale on the machine to indicate the carriage position. The scale also shows the setting of the margin stop 162. The keys which operate the machine are shown in Figure 1 marked with the numerals 1 to 12 ("0" representing "10") and with "Space" and "Rel."

Each card may be punched in any one of twelve different positions in each column by means of the twelve numerical keys. The space key moves the carriage one position to the left without punching, and the release key releases the carriage for a full return to the left to the position of Figure 1 to remove the card and insert a new one. This release key will be used when a mistake in punching has been made, or when the punching desired to be made on any card does not include one or more of the columns at the right hand edge of the card. When all the columns in the card are punched the carriage will return to the position to remove the card and insert a new one without operation of the space or release key.

Figure 9:
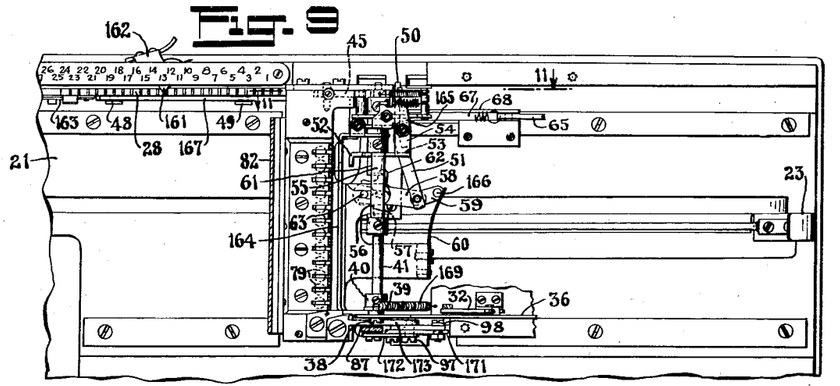
Figure 9 is a plan view along the line 9—9 of Figure 7.
Figure 11:
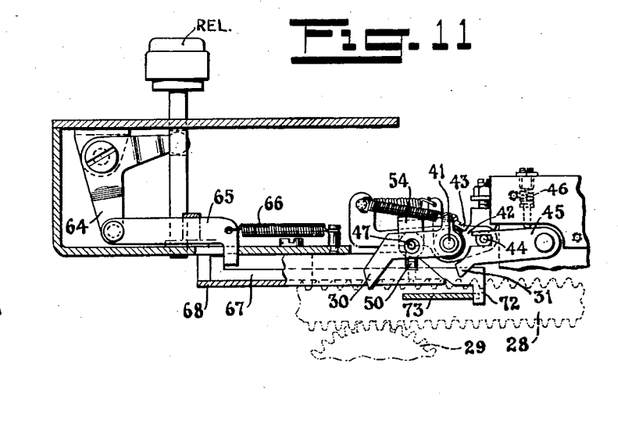
Figure 11 is a rear elevation of a portion of the machine, partly in section, showing the escapement and release mechanisms.

The carriage is attached to an escapement rail 28 which has spacing teeth on its top surface, as shown in Figures 1, 9 and 11, and gear teeth on its bottom surface, as shown in Figure 11, which mesh with a pinion 29. Pinion 29 is provided with a spring (not shown) which tends to pull the carriage to the left whenever it is permitted to do so by release of pawls 30 and 31 which engage the spacing teeth at the top of the escapement rail 28.

When the space key is pressed the carriage is moved one space to the left through the space key mechanism. When one of the numerical keys is pressed the carriage is moved one space to the left through mechanism operated by the electrical operation of the punch. When the release key is pressed the carriage moves all the way to the left through the release mechanism. When the "11" key is pressed a hole corresponding to the "11" position is punched in the card and also, if the tabulator rack is in position on the machine, the carriage will move to the left to the end of any raised portion of the tabulator rack which may be engaged by the end 50 of the arm 51 when this key is pressed.

Figures 4, 5, 6:
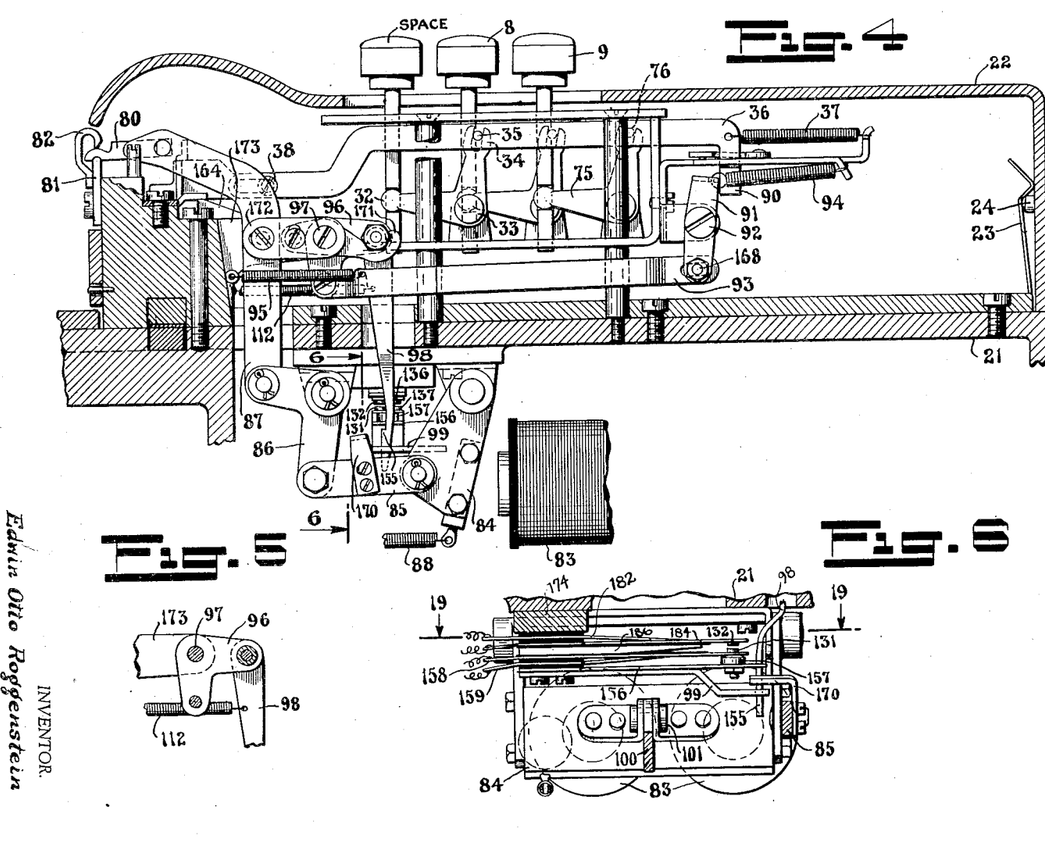
Figure 4 is a section of my device along the line 4—4 of Figure 1.
Figure 5 is a detail of some of the apparatus shown in Figure 4.
Figure 6 is a section along the line 6—6 of Figure 4.

The space key is indicated by the word "Space" in Figure 4. When this key is pressed it operates a bellcrank lever 32 which is pivoted at 33 and has a forked end 34 which engages a pin 35 on an interposing slide 36. This interposing slide 36 is normally maintained in its position to the right as shown in Figure 4 by means of a spring 37. The interposing slide is rigidly connected by means of a screw 38 to an extension 39 which is fastened to a collar 40 fixedly mounted on a bearing escapement rod 41 (Figures 9 and 11). An arm 42 is mounted on a collar which is secured to the rod 41 near its other end by means of a screw 43. When the space key is pressed, therefore, the rod 41 is rotated and the arm 42 is lowered from the position shown in Figure 11. A pin 44 on this arm engages a slot on an escapement pawl 45. When the arm 42 is lowered, therefore, the escapement pawl 45 is forced into a lower position by a spring 46, and permits the pawl to engage a tooth on the escapement rail 28 to prevent it from moving more than one space. The other end of the bar 42 also has a pin 47 which projects through a hole in the stepping pawl 30 with considerable room for lost motion. When the right hand end of the rod 42, Figure 11, is lowered the left hand end is raised and the pin 47 engages the stepping pawl 30 and raises it so that the spring which energizes the gear 29 forces the carriage rail 28 to the right as shown in Figure 11, into engagement with the escapement pawl 45. This permits a very small amount of movement, on the order of a few thousandths of an inch, which is sufficient to place the stepping pawl beyond the surface of the tooth in the carriage rail which it was engaging, so that when the space key is released and the stepping pawl is permitted to return to engagement with the carriage rail it will engage the next tooth. This occurs on the release of the space key, at which time the escapement pawl will be raised to move from engagement with a tooth on the carriage rail and permit the carriage rail to move along one space until stopped by engagement with the stepping pawl at the next space. A spring 169 returns the extension 39, and hence the rod 41, to its original position when the "Space" key is released.

Figures 22, 23, 24, 25:
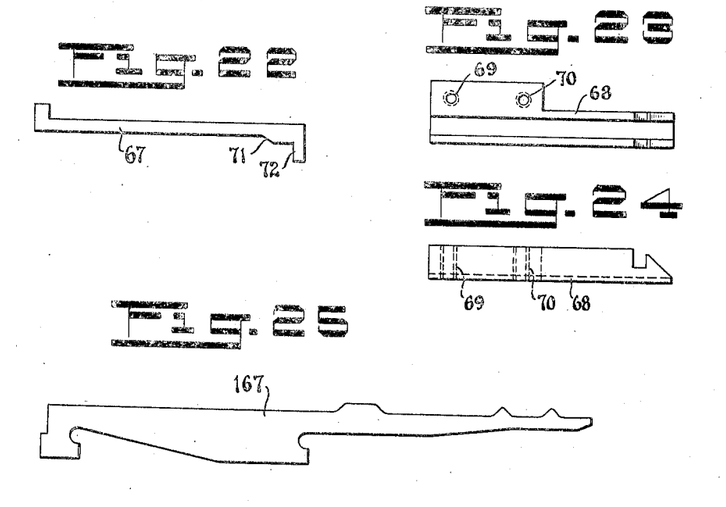
Figure 22 is a side view of the release cam.
Figure 23 is a plan view of the release cam guide shown in Figure 11.
Figure 24 is a side view of the release cam guide.
Figure 25 is a side view of the tabulating rack.

The punch may also be provided with a tabulator mechanism which operates on pressing the "11" key. The "11" key is used to operate this mechanism because it then punches a hole which is used to control a similar skipping operation in the tabulator machine when the cards are being tabulated. This is accomplished by means of a tabulator rack 167, shown in Figures 10, 25, 26 and 27, which is inserted on the carriage rail on the rivets 48 and 49 and held in position by spring 163. This tabulator rack has high portions which engage the under surface of a bar 51 (Figures 9, 25, 26) when extended to the right (Figure 27), and lower portions which pass under such bar without engaging it.

It will be noted that when any of the numerical keys except the "11" key are pressed, as will be described later, and the hammer is operated by the punch magnet, the universal escapement bar 164 is pressed downward to operate the escapement and move the carriage one space. The universal escapement bar 164 has a cutout under the interposing slide operated by the "11" key, however, so that the escapement is not operated in this manner by the "11" key. Instead the interposing slide operated by the "11" key operates the "11" key escapement bar 52 (Figure 9) which is loosely mounted on the escapement rod 41 and which has a rear extension 53 and a lateral extension 54 (Figure 9) which operates the escapement by lifting a bar 165 which is secured to the rod 41, to raise the stepping pawl and lower the escapement pawl. The bar 52 also has a lateral extension 55 at the end of which is a downward extension 56 which is loosely mounted on the rod 41, and which engages a projection 57 on a rocking arm 58. The rocking arm 58 is linked to an arm 59 which has a stud 166 engaged by a compression spring 60. The arm 58 is accordingly thrown past center and the toggle action provided by the spring 60 retains it in this position. This throws the bar 51 upward of the paper, as shown in Figure 9 (to the right, Figure 26), so that its lower surface is in position to engage a raised portion of the tabulating rack, as shown in Figure 27.

When a raised portion of the tabulating rack is thus engaged the stepping pawl is raised by the end 50 of the bar 51, and the carriage skips until the end of the raised portion is reached when the stepping pawl is again permitted to engage the carriage rack and stop the carriage in position for the next desired operation. The escapement pawl is not affected because of the lost motion between the pin 47 and the hole in the stepping pawl 30.

The bar 51 is thrown over so that it is in position to engage any raised portion on the tabulating rack each time the "11" key is pressed, and is returned each time any of the numerical keys other than the "11" key is pressed. In the normal operation of this punch, in accordance with the accounting systems for which it is devised, the "11" key will not ordinarily be punched except when it is desired to operate the skipping mechanism. Also the tabulating rack is arranged with its raised and lowered portions in accordance with a particular job for which cards are being punched so that whenever the "11" key is punched for a skipping operation a raised portion of the rack will be engaged to cause the skipping to the desired position.

Figure 26:
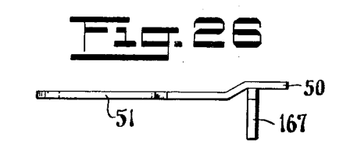
Figure 26 is an end view of the tabulating rack, showing a side view of the stepping pawl lifting arm operated by the "11" key, in its unoperated position as seen from the right in Figure 9.
Figure 27:
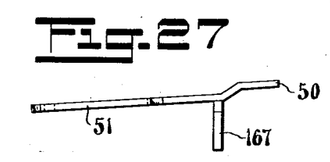
Figure 27 is a view of Figure 26 with the stepping pawl lifting arm in its operated position.
Figure 28:
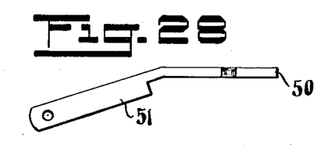
Figure 28 is a plan view of the stepping pawl lifting arm.

When a key other than the "11" key is punched, a finger 61 mounted underneath and secured to the rod 41 is moved to the right as shown in Figure 9 due to the rotation of rod 41, and engages a projection 62 on the rocking arm 58, returning this arm to its first position, and moving the arm 51 downward of the paper in Figure 9 to the position shown in that figure and in Figure 26, where it will no longer engage a raised portion on the tabulating rack. A pin 63 engages the slotted end of rocker arm 58 in order to restrict and guide its movement.

The mechanism operated by the release key is shown in Figures 11, 21, 22, 23 and 24. When the release key is pressed a bellcrank lever 64 is operated which draws a rod 65 to the left, as shown in Figure 11, against the tension of a spring 66. A projection at the bottom end of the rod 65 engages a raised portion of a release cam 67 (Figures 11, 21, 22), and draws it to the left (Figure 11). The release cam is set in a release cam guide 68, Figures 11, 23, 24, which is mounted on the frame of the machine by means of bolts inserted in the mounting holes 69 and 70. When the release cam is moved to the left its cam surface 71 rides up over the end of the release cam guide and raises the end 50 of the bar 51, raising the stepping pawl and releasing the carriage so that it returns to its starting position by the spring connected to the gear 29. When the carriage has returned to its starting position at the left of the machine as seen in Figure 1, a projection 72 on the release cam engages a stud 73 (Figures 10, 11), mounted on the carriage rail. This moves the release cam to the right, Figure 11, so that the cam surface 71 no longer rides on the release cam guide 68 and the stepping pawl is therefore permitted to return to its position in engagement with the teeth at the top of the carriage rail.

Only one of the numerical keys may be pressed far enough to complete a contact at any one time due to the operation of a series of single key lock paddles 74, Figure 1. There is enough clearance between all of these paddles to permit any one of the interposing slides to move forward, but not enough clearance to permit two of them to move forward, and if more than one key is pressed at one time all keys pressed at that time are, therefore, locked so that none may complete a circuit.

Figures 7, 8:
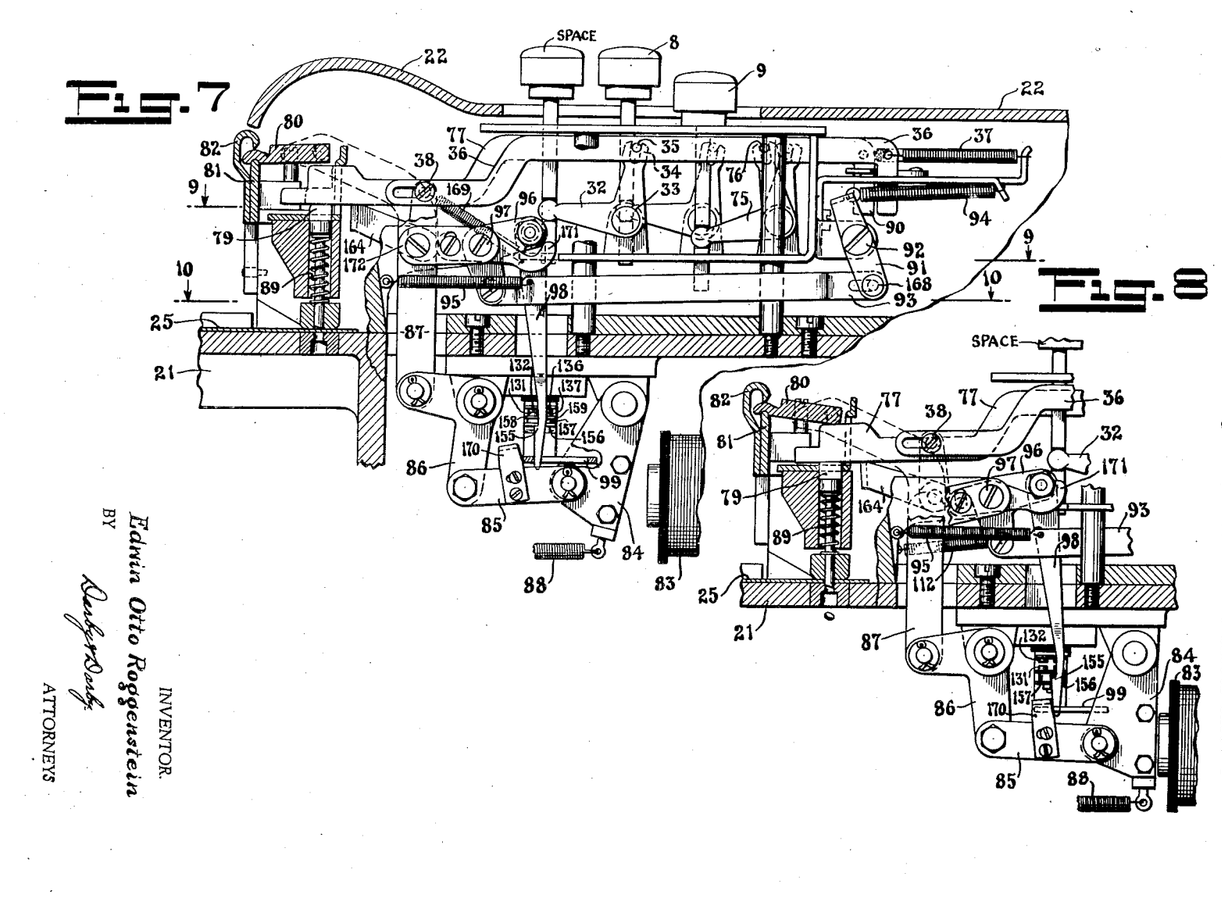
Figure 7 is a section along the line 7—7 of Figure 1.
Figure 8 is a view of a portion of the apparatus shown in Figure 7 at a slightly later stage in the operation of the machine, showing the relative movement of parts during operation.

When one of the numerical keys is pressed, for example the "9" key, Figures 4, 7, 8, it operates bellcrank lever 75, the upper end of which is slotted and engages a pin 76 on the "9" key interposing slide 77, which is directly behind the space key interposing slide 33 (Figure 4) against the tension of a spring 78 (Figure 1). The "9" key interposing slide 77 is accordingly moved to the left as shown in Figure 4, to the position shown in Figures 7 and 8. The lower surface of this interposing slide is always over the "9" key punch 79, but is now moved sufficiently to the left so that the projection on its upper surface is under the hammer 80, which is pivoted between bearings 81 and 82.

Pressing the "9" key completes a circuit through the punch magnet 83 which draws its armature 84 as shown in Figure 8. The armature 84 is connected through linkage 85 to bellcrank lever 86 which is connected through linkage 87 to the hammer 80. The hammer is, therefore, pulled downward in a rapid movement which gives a blow to the interposing slide 77 and causes the "9" punch 79 to punch a hole in the proper position in the card 25. As soon as the magnet 83 is energized to operate the hammer the circuit is broken and the hammer is immediately returned to its previous position by the armature return spring 88, Figures 2, 4, 7 and 8. This releases the pressure on the "9" key punch 79, which is also therefore returned to its previous position by the spring 89.

When the hammer 80 hits the interposing slide to drive the corresponding punch through the card, this interposing slide (except in the case of the "11" key interposing slide, the operation of which has already been described) also operates the universal escapement bar 164 to force it downward. As the universal escapement bar is fixed to the escapement rod 41, the rod is rotated to operate the escapement and step the carriage one step to the left in the manner which has already been described in connection with the operation of the "Space" key, which also rotates the rod 41.

The structure associated with each of the numerical keys (except the "11" key) is identical with that just described, and to be described, in connection with the "9" key. In each case a circuit through the magnet is completed, an interposing slide is moved to the left so its raised portion is under the hammer, the hammer operates to cause the interposing slide to drive its punch through the card and to operate the universal escapement bar 164 to operate the escapement through the escapement rod 41, the rod 51 is returned to normal position (if the last previous punch had been an "11"), and the circuit through the magnet is broken.

When any one of the numerical keys is punched, a tail, such as the tail 90 projecting downwardly from the right hand end of the "9" key interposing slide 77 (Figures 4, 7) engages an electric contact universal bar 91, moving it to the left around its pivot 92. (The space key interposing slide tail is cut short so that it does not engage the universal bar 91.) The lower end of the universal bar 91 has a pin 168 which engages a slot in a linkage 93 with sufficient lost motion to permit a small amount of movement before the linkage is pulled to the right (Figures 4, 7). This motion is sufficient so that if two keys are pressed at the same time they will lock due to the lock key paddles 74, Figure 1, before there is any movement of the linkage 93. As it is the movement of the linkage 93 which completes the contact which is made by pressing one of the numerical keys, this prevents any possibility of completing these contacts when two keys are pressed simultaneously. Also this lost motion prevents the contact being made before the interposing slide 77 has moved far enough to the left, Figures 7, 8, so that its raised portion is below the hammer 80. It is therefore impossible for the circuit through the magnet to be completed to cause the operation of the hammer 80 before one of the numerical key interposing slides is in position to be struck by the hammer to operate its corresponding punch, such as the "9" key punch 79. It is also impossible to operate the machine with more than one key at a time. The tail springs 37, 78, etc. (Figure 1), restore the keys and the interposing slides to their original positions after they are released.

The movement of the electric contact universal bar 91 to the left, Figure 7, is against the tension of a spring 94 which returns it to its position when the key is released. The movement of the linkage 93 to the right, Figure 7, is against the tension of spring 95 which returns it to the left when the key is released. The linkage 93 is connected to a bellcrank lever 96 which is pivoted at 97 and the other end of which is connected to a contact engagement pawl 98 so that this pawl is raised to close the electrical contacts which complete the circuit through the magnet. The engagement pawl 98 is loosely mounted on the bellcrank lever 96 so that it is permitted some movement to the right and left, Figures 7 and 8. It is guided in this movement by the engagement pawl guide 99, Figures 4, 6, 7 and 8. The operation of this pawl and the contacts will be described later.

Figure 2:
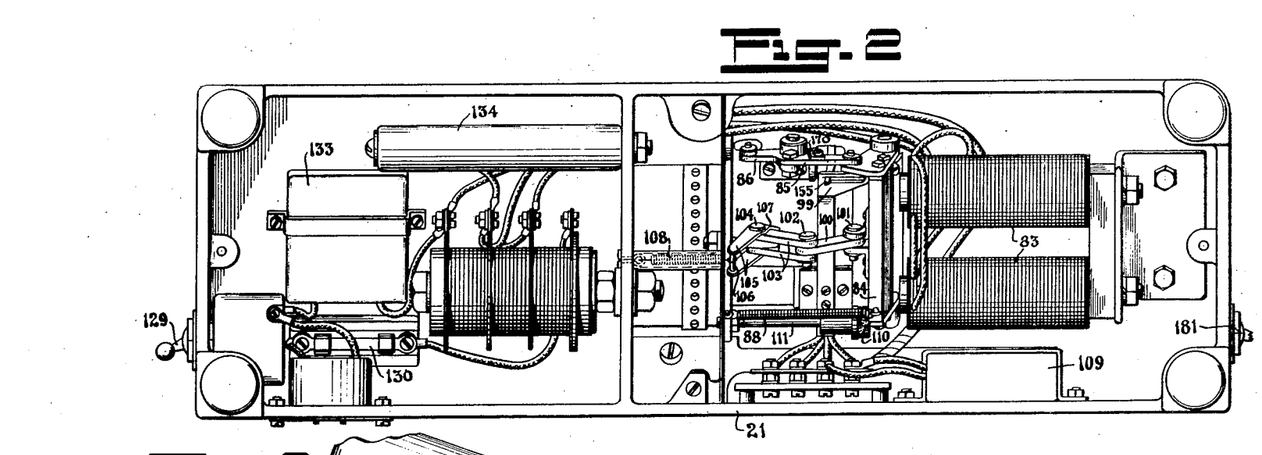
Figure 2 is a bottom view of my new device.
Figure 3:
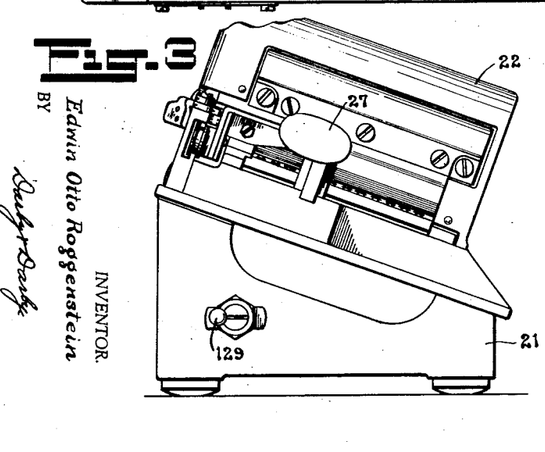
Figure 3 is a side elevation of my new device looking from the left in Figure 1.

The relay armature 84 is connected to an overthrow linkage consisting of a link 100 pivoted at 101 and 102, Figure 2, and connected at 102 to a pair of links 103 which are pivoted at 104. A lever 105 having two side members joined by a cross bar 106 is pivoted at 104 and has a solid projection 107 across the tops of the two links 103. The cross bar 106 is attached to a spring 108. When the armature 84, Figure 2, is drawn to the right the two links 100 and 103 tend to straighten out so that the upper surface of the links 103 are brought into contact with the projection 107 on the lever 105. This occurs when the two links 100 and 103 are very nearly straight. Any further movement of the armature tends further to straighten out these two links and then to throw them past center, but as the upper surfaces of links 103 are engaging the projection 107 on lever 105, and as this lever is connected to the spring 108, this further movement is against the tension of spring 108 so that it is resisted by this spring.

The armature and magnet are adjusted so that the maximum movement of the armature to the right is just sufficient to clear the poles of the magnets by approximately 10/1000 of an inch, and at this position of course the links 100 and 103 will be straight. Any overthrow of the links 100 and 103 beyond their straight position will be strongly resisted by the spring 108 which will therefore promptly return the overthrow mechanism to its original position as shown in Figure 2. The linkage between the armature 84 and the hammer 80 is such that this hammer is operated to cause the card to be punched before the armature has reached the position where the overthrow spring 108 comes under tension. The overthrow spring 108 when picked up provides a strong tension to return the overthrow mechanism just below its straight position. The armature return spring 88 returns the armature the rest of the way to the position shown in Figure 2 which returns the overthrow mechanism also to the position shown in that figure.

A condenser 109 is connected across the contacts of the machine circuit to prevent sparking. A rod 111 having on its end a pad 110 is provided to adjust the spacing of the armature from the magnet. A spring 112, Figures 4, 5 and 8, keeps the contact engagement pawl pulled to the left and returns it to this position after it is raised to close the contacts and moved to the right, as shown in Figure 8, to release them. An arm 170, secured to the armature 84, engages the engagement pawl 98 when the armature 84 is operated, to cause it to release the contacts.

All of the structure which has been described above is part of a commercial device which has been manufactured by the Powers Accounting Machine Division of the Remington Rand Company, Inc., for many years, and is now in commercial use to the extent of many thousands. It is also similar in function, and generally similar in structure and operation, to a device manufactured commercially by the International Business Machine Company. It has been described in detail here in order to avoid any possible question of a complete disclosure of the structure of the machine which embodies my invention. My invention consists in new types of rectifier assemblies, and new circuits and contacts, and the combination of such new elements with the structure described above.

Figure 13:
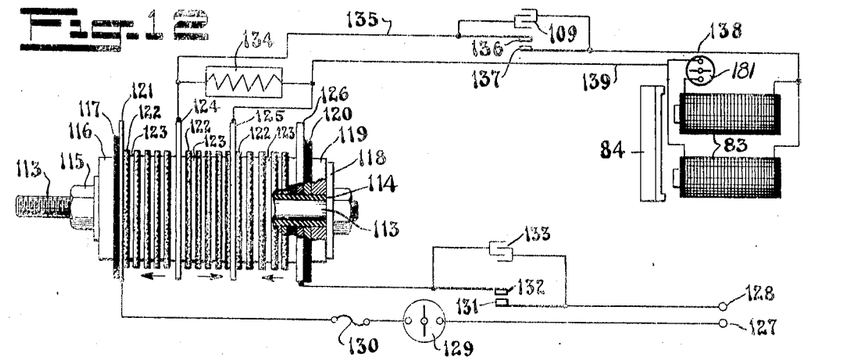
Figure 13 is a schematic diagram of the circuit and apparatus shown in Figure 12 illustrating the operation of my new circuit and device.

In describing the novel features of this machine, I will first refer to the circuit diagrams of Figures 12 and 13. In Figure 12 I have indicated diagrammatically the new rectifier assembly which I use. This rectifier may be made of dry contact rectifying discs of the copper oxide or magnesium copper sulphide type, such as are well known and are described, for example, in United States patents to Ruben No. 1,649,741, of November 15, 1927; No. 1,751,361, of March 18, 1930; and No. 1,751,460, of March 18, 1930, and will be referred to hereafter as simply a copper oxide rectifier. Rectifiers using such discs are manufactured and sold commercially as "Rectox" rectifiers.

In Figure 12 I have shown a number of these discs in one arrangement of my novel assembly. In this figure the discs are held together by a central bolt 113 which is insulated from the assembly by an insulating cylinder 114 and which holds the assembly together under pressure by the nut 115 which bears against a heavy disc 116 insulated from the assembly by an insulator 117. At the other end of the assembly there is a washer 118, another heavy disc 119, and another insulator 120, all of which cooperate to hold the rectifying discs together under pressure.

At the left of the assembly of the rectifier proper I have a conducting disc 121 which may be of brass. Pressed against this disc is my first copper disc 122 (Figure 29) having a surface coating of copper oxide or magnesium copper sulphide or any other material which will perform the same function. The coated surface is indicated by the jagged line. This surface is on the right hand side of the copper discs between the discs 121 and 124 in Figure 12. Pressed against the copper oxide surface of my first disc 122 is a lead disc 123. The assembly continues with successive copper oxide and lead discs, with the copper oxide coating facing in the same direction, until a second conducting disc 124, which may also be of brass, is reached. There is a lead washer next to the disc 124 on each side. From this point the assembly continues with successive lead and copper discs, but it will be noted that at this point the direction in which the copper oxide surfaces face is reversed from the direction in which these surfaces faced between the discs 121 and 124. They continue facing in the new direction until another conducting disc 125, which may also be of brass, is reached, and at this point the direction again reverses. The assembly continues until a fourth conducting disc 126, which may again be of brass, is reached, which it at the right hand edge of the rectifier assembly proper as seen in Figure 12. A lead disc is placed just next to the disc 126. The direction in which current will flow through each section of this assembly is indicated by the arrows below the sections. The rectifier of Figure 12 comprises approximately 30 copper oxide discs, ten in each section.

Figure 29:
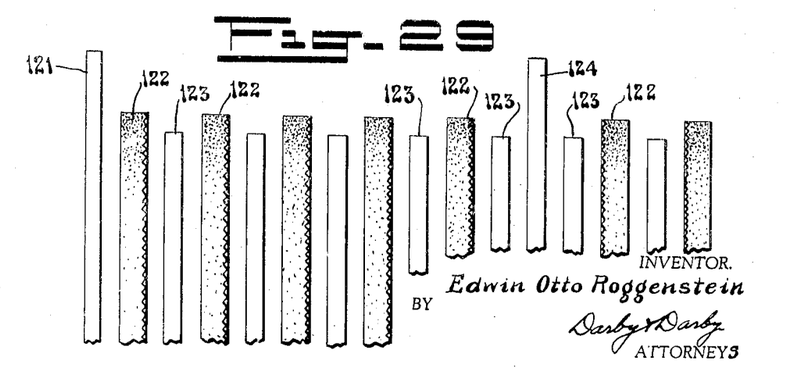
Figure 29 is an enlarged exploded view of a portion of the rectifier of Figure 12.

In Figure 29 I have shown an enlargement of a portion of Figure 12 so the structure may be seen in more detail.

The terminals 127 and 128 may be connected to any power line of alternating or direct current of 110 to 150 volts. A switch 129 and a fuse 130 are provided in the power circuit. The switch 129 may also be seen in Figures 1 and 2 and the fuse may be seen in Figure 2. A pair of contacts 131 and 132 is connected in this portion of the circuit and a condenser 133 is connected across them to prevent sparking. This condenser may also be seen in Figure 2.

In describing these circuits, both in what has been said above and what will follow, I shall call that portion of the circuit between the input terminals 127 and 128 up to the rectifier the power circuit, and that portion of the circuit beyond the rectifier the machine circuit.

Connected across the discs 124 and 125 I have a resistance 134, Figures 2, 12 and 13, which in a preferred embodiment of my invention is approximately 250 ohms. From the disc 124 the machine circuit goes by lead 135, through contacts 136 and 137, to lead 138, magnet 83, the windings of which are connected in parallel, lead 139, back to the disc 125 on the other side of the resistance 134. The condenser 109 is connected across the contacts 136 and 137 to prevent sparking.

The rectifier assembly of Figure 12 is such that if a positive potential is applied to the terminal 128, and of course if the switch 129 and contacts 131 and 132, are closed, a current will pass from right to left in the section of the rectifier, from disc 126 to disc 125. At the disc 125 it will be noted again that the direction in which the copper oxide surfaces of the copper discs face is different from the direction in which they face between the discs 126 and 125. Between the discs 125 and 124, therefore, no current will pass except leakage current. At the disc 124 the direction of the copper oxide surface is again reversed so that current would pass between the discs 124 and 121. As the rectifier therefore permits current to flow from disc 126 to disc 125 and from disc 124 to disc 121 it will be seen that a circuit through the machine may be completed by connecting this circuit across the discs 125 and 124 and therefore by this connection current will be permitted to flow through the circuits of the machine.

If a positive potential is applied to the terminal 127 no current can flow between the discs 121 and 124 nor can current flow between the discs 125 and 126 so that the machine will not operate from a direct current power source unless the jack is inserted in the plug with the proper polarity.

If an alternating current power source is connected across the terminals 127 and 128 the rectifier will operate to rectify the positive pulses of potential applied to the terminal 128 and pass current in this direction in the same manner as it passes direct current applied with the positive potential to terminal 128. This is illustrated in Figures 16 and 17.

Figure 16:
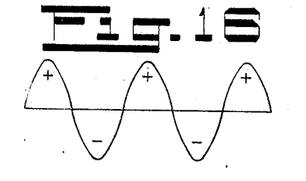
Figure 16 is a graph illustrating the fluctuations in a source of alternating current.
Figure 17:
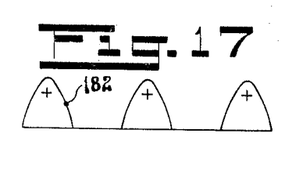
Figure 17 is a graph showing the form of rectified current with which I operate my machine with the circuit and apparatus shown in Figures 12 and 14 when operating in each case from an alternating current power source.

In Figure 16 an alternating current source is shown and in Figure 17, directly below it, the rectified positive pulses are shown. It will thus be seen that when operating from alternating current a pulse of current passes through the rectifier for each positive half cycle on the terminal 128 and that this rectified current is permitted to flow through the machine circuit across the discs 125 and 124. I do not know now the wave shape of the rectified pulses, so Figure 17 is simply illustrative of the operation as to time.

When one of the numerical keys is pressed, both the contacts 131, 132 and 136, 137 are closed and are left closed until they are broken by the release of the latch through the operation of the finger 170 on armature 84. The mechanism whereby this is accomplished will be described later. At this time it is simply noted that contacts 131, 132 and 136, 137 are made simultaneously by the operation of a numerical key, and broken simultaneously by the magnet armature.

When the machine is operating from alternating current in the circuit of Figure 12, it will be seen that the contacts closed by the operation of the key must remain closed until a positive half cycle of current occurs on the terminal 128. Otherwise there will be no current through the machine circuit. There is never a delay of more than 1/120 of a second between times when a positive half cycle is present on terminal 128 when the machine is operated from a normal 60 cycle power source. This does not slow up the operation of the machine as the fastest punching time possible for the speediest operators is slower than the slowest operating time of the machine even though it had to wait the maximum time possible (1/120 of a second) before beginning its operation.

The speed of a fast operator in operating a machine of this type ranges from .02 to .09 second per punch. Assuming the fastest operation of .02 second, and assuming that one punch occurred just at the start of a negative half cycle on the terminal 128, the contacts would be closed immediately, but the machine would wait a full 1/120 of a second or .0083 second before the magnet would begin to be energized. The operating time of the magnet is between .006 and .009 second. Adding the maximum waiting time to the slowest operating time of the magnet this would total .0173 second, so that the operation would be completed and the machine restored .0027 second before the next punch would be made, with a single possible theoretical exception. When the machine is operating from direct current the current is, of course, always available instantly so there is no waiting time.

The possible theoretical exception is when a key is punched too far along during one of the half-cycles of rectification, as indicated for example at 182, Figure 17, for the magnet stroke to be completed before the end of the half-cycle. In this case, theoretically, the machine might have a sufficiently long waiting time to complete its action before the operator punched the next key and cause an error to occur. In actual operation, however, the machine is satisfactory, and no difficulty is experienced on this score.

A switch 181 may be provided as shown in Figure 12, to open the circuit through one of the magnet coils 83 when operating from a D. C. source, and thereby increase the resistance of the load, as a higher voltage is applied to the machine circuit when operating from D. C. than from A. C. The machine will operate satisfactorily when using D. C. with the switch 181 open, and only one magnet coil in circuit. The switch 181 may be mounted on one side of the machine as shown in Figures 1 and 2.

In Figure 13 I have shown a schematic diagram of the circuit in Figure 12 and corresponding parts are similarly numbered. Here I have shown a rectangle 122 and a solid triangle 123 to indicate a section of the copper oxide rectifier. The current flow is in the direction of the point of the solid triangle. It will be seen from Figure 13 that when a positive source of current is applied to the terminal 128 it cannot pass through the rectifier due to the middle portion but it can pass through both end sections of the rectifier and the circuit can be completed through the machine circuit.

In my rectifier unit shown in Figure 12, I employ about 30 junctions, each junction consisting of one copper oxide disc and one lead disc, and have about ten of these junctions in each of the three sections of the rectifier. The maximum current in the machine circuit is approximately 2½ amperes when operating from an alternating current power source, and approximately 3.5 amperes when operating from a direct current power source. The switch 181 shown in Figures 1, 2, 12 and 13 may be opened to increase the resistance of the circuit when D. C. operated by cutting one magnet coil out of the circuit, which brings the current flow down to the same as an A. C.

As the power circuit and the machine circuit are both broken at the same time through contacts 131, 132 and 136, 137 respectively, by the operation of the magnet, and as the operating time of the magnet is a maximum of .009 second, only the briefest pulses of current flow through any portion of my circuits. There is, therefore, no danger of the rectifier overheating or of the machine circuit elements drawing excessive current. In fact, in operating from either alternating or direct current, even with the switch 181 closed, I find it possible to use a one ampere fuse 138. The use of a one ampere fuse is desirable to protect the rectifier unit from overheating in the event any of the mechanical parts should keep the contacts from opening.

Figure 14:
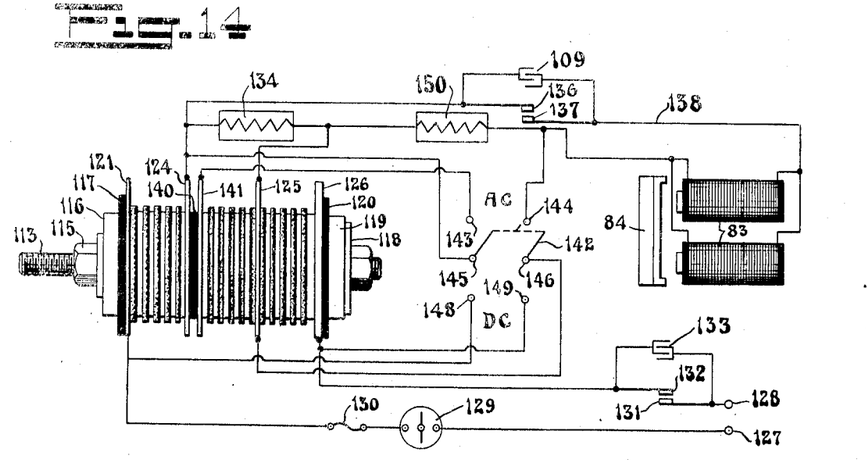
Figure 14 is a diagram of an alternative circuit and rectifier assembly to that shown in Figure 12.
Figure 15:
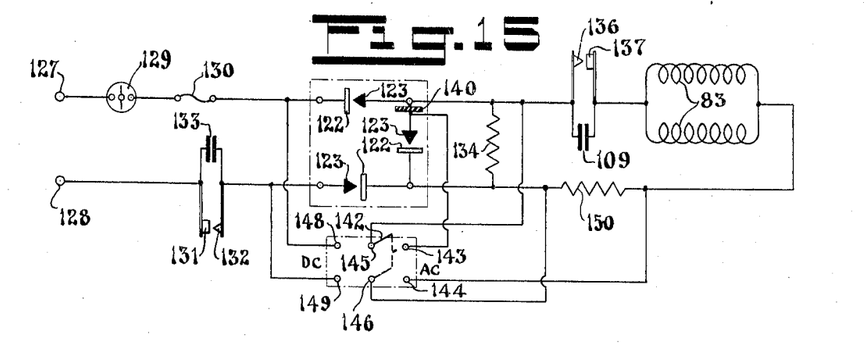
Figure 15 is a schematic diagram of the circuit and apparatus shown in Figure 14.

In Figures 14 and 15 I have shown an alternative circuit arrangement which may also be used for operating from alternating or direct current. In this circuit the polarity of the D. C. current does not matter as the machine will operate equally well whichever polarity is present on the terminals 127 and 128. In this circuit my rectifier is assembled just as before except that an insulating disc 140 and an extra conducting disc 141 are inserted at the positions shown. I provide a double-pole, double-throw switch 142 which for operation on direct current is thrown to its lower position (Figure 14) to connect with the terminals 148 and 149. In operating on direct current, therefore, with the terminals 148 and 149 connected to the terminals 145 and 146 through the switch 142, my circuit is as follows: From terminal 127, through switch 129, fuse 130, terminal 148, switch 142, terminal 145, contacts 136 and 131, magnet 83, resistance 150, which simply reduces the amount of current so that it will not exceed current drawn by the machine when operating from alternating current, disc 125, to terminal 146, switch 142, terminal 149, contacts 131 and 132, back to terminal 128. It will thus be seen that when operating on direct current with this circuit the rectifier is completely shunted out of the circuit and it is for this reason that the polarity of the current supplied to the terminals 127 and 128 does not matter. It will also be noted that the resistance 150 permits the current drawn by the machine to be reduced so that it does not exceed the current drawn by the machine when operating on alternating current. It is provided because the rectifier is shunted out of the circuit. It also avoids any desirability of using a switch such as the switch 181 of Figures 12 and 13.

When operating the circuits of Figures 14 and 15 on alternating current, I throw the switch 142 to its upper position (Figure 14) so that it makes contact with terminals 143 and 144. The circuit is then from terminal 128, through contacts 131, 132, disc 126, through the section of the rectifier from disc 126 to disc 125, through contact 146, switch 142, contact 144, magnet 83, contacts 136 and 137, disc 124, through the section of the rectifier from disc 124 to disc 121, through fuse 130 and switch 129, back to terminal 127. It will be noted that the insulating disc 140 is short-circuited by the connection from disc 124, terminal 145, switch 142, and contact 143, back to the disc 141, so there is a leakage path in shunt to resistance 134 in the section of the rectifier from disc 125 to disc 124, as in Figure 12. It will also be noted from the circuit description above that the resistance 150 is shunted out of the circuit. The circuit of Figures 14 and 15, therefore, with the switch in its upper position (Figure 14) for alternating current operation, is identical with the circuit of Figures 12 and 13, while with the switch 142 in its lower position for direct current operation the rectifier is shunted entirely out of the circuit and resistance 150 is placed in series with the magnet.

Figure 18:
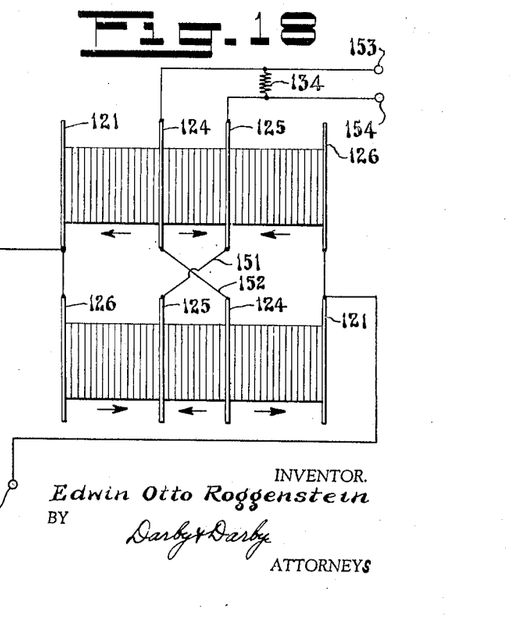
Figure 18 is a diagrammatic showing of an alternative arrangement of a rectifier and circuit for full wave rectification.

In Figure 18 I have shown a full wave rectifier built in accordance with the principles of this rectifier assembly which may be used if desired with a machine of this type, or for any other purpose where it might find a use. Here again I have indicated the power terminals at 127 and 128. The two rectifier assemblies shown in Figure 18 will each be built up just as the rectifier shown in Figure 12, but one will be reversed. In Figure 18 I have shown the upper one facing in the same direction as Figure 12 and the lower one reversed, as indicated by the reference numerals on the contact discs, and by the arrows which indicate the direction of current flow in each section. If a positive pulse is applied to terminal 127 it will therefore pass from disc 126 to 125 in the lower assembly, through connection 151 and disc 125 on the upper assembly to contact 154, through the load to terminal 153, disc 124, connection 152, disc 124 of the lower assembly to disc 121 and back to terminal 128. When a direct current pulse is applied to terminal 128, this will pass from disc 126 to disc 125 in the upper assembly, to terminal 154, through the load to terminal 153, to disc 124, through the upper assembly to disc 121, and back to terminal 127. It will be noted that in each case the portion of both assemblies between discs 124 and 125 provides leakage paths in parallel across resistance 134, which is in shunt to the load. This makes the circuit for the rectification of each half cycle identical with the circuit of Figure 12, except that the leakage paths constituted by the middle portions of the assemblies are in parallel. This does not affect the operation.

I thus secure full wave rectification, and the machine circuit connected across the terminals 153 and 154 would have no waiting time after a key was punched and the contacts closed before the magnet would be energized. Such a rectifier assembly will be useful for types of machines where the operation is much faster than is required for the present Powers punch. As explained above, the half wave rectifier shown in Figure 12 is adequate for every purpose for such a punch.

With the assembly and connections shown in Figure 18 I obtain full wave rectification of 110 to 150 volt current with only 30 discs in each of my two assemblies, or a total of 60 discs, as compared with approximately 110 discs required with an assembly arranged in the usual assembly and circuit of the prior art.

Figure 19:
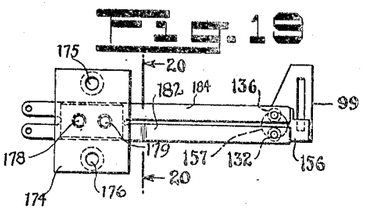
Figure 19 is a plan view of the contacts along the line 19—19 of Figure 6.
Figure 20:
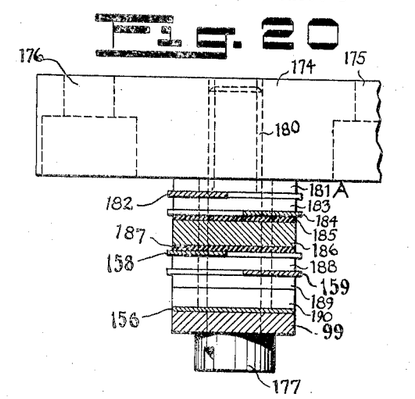
Figure 20 is an enlarged sectional view of a portion of the contacts along the line 20—20 of Figure 19.
Figure 21:
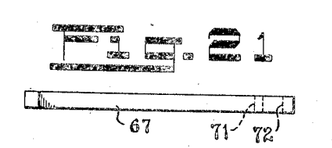
Figure 21 is a plan view of the release cam shown in Figure 11.

We turn now to the novel mechanical structure which my machine incorporates with the circuits described above. It has already been described how the engagement pawl 98 closes the machine circuit contact in the machine now in commercial use. In my new machine, I provide split contacts, as shown in Figures 6, 19 and 20. In Figure 7 I show the machine with the "9" key punched, engagement pawl 98 raised so that its latch 155 comes in contact with a flexible steel spring 156 on which is mounted an insulating washer 157 which raises both of the lower contact leaves 158 and 159 and brings the contacts 131 and 137 into engagement with the contacts 132 and 136. This completes the power circuit and also completes the machine circuit through the magnet 83, causing it to attract its armature 84 and operate the hammer 80. As the armature is attracted and the hammer 80 operated a finger 170 secured to link 85 engages the lower end of the engagement pawl 98 and moves it to the right in Figure 8 so that the latch 155 releases the steel spring 156 and permits the contacts to be broken. The spring 112 then draws the engagement pawl 98 contact back to its position shown in Figure 7 so that it is in readiness again to close the contacts upon the striking of the next key. The pawl 98 is returned to the position shown in Figure 4 by the spring 95 connected to linkage 93. These contacts 131, 132, 136 and 137, shown in Figures 4, 7, 8 and 19 are the same contacts shown in Figures 12 to 15 which are in the power and machine circuits respectively.

It will thus be seen that simply by the provision of a small thirty disc rectifier assembly in my novel manner, a novel contact arrangement, and a novel circuit, I am able to adapt a standard Powers or International business machine punch, such as is now in commercial use, so that at an increased weight of not more than one or two pounds it will operate with equal efficiency from either alternating or direct current. My improvements may be built into the present machine without changing its present design or external appearance, the rectifier and other new parts being mounted in the base in space that is now not used.

The contacts shown in Figures 4, 6, 7, 8, 12, 13, 14, 15 and 19, and in enlargement in Figure 20, are mounted on a contact block 174 secured to the frame of the machine by bolts through holes 175, 176 (Figures 19, 20). The contact assembly is secured to the contact block by two screw headed bolts 177 mounted in taps 178, 179, and surrounded by insulating cylinders 180. Directly underneath and next to the block 174 is an insulator 181A. Underneath this is the first contact leaf 182 which carries contact 132, then an insulator 183, contact leaf 184 which carries contact 136, and insulating strip 185, and a heavy metallic strip 186 which holds the leaves 182 and 184 in position. Next is another insulating strip 187, then contact leaf 158 which carries contact 131, an insulator 188, contact leaf 159 which carries contact 137, two insulators 189 and 190 together (which may of course be a single insulator), steel spring 156 which carries disc 157, and engagement pawl guide 99. The cooperation of these elements, with each other, and their operation in the machine, will be clear from the drawings and foregoing description.

Referring again to Figure 12, the successful operation of this device is possible because of the novel manner of assembling the discs of the rectifier shown in that figure. Whenever there is a positive half cycle of current applied to the terminal 127 there is a certain amount of leakage current through the rectifier between discs 121 and 124 and discs 125 and 126 in spite of the fact that these discs are arranged not to pass current in this direction. By including a rectifier unit between the discs 124 and 125, this leakage current is by-passed during one half cycle without changing the circuit characteristics during the other half cycle. By breaking the contacts 131 and 132 at each operation of the machine I prevent drawing excess or unneeded current through the rectifier and prevent its overheating, but at the same time provide a sufficient voltage and current for the efficient operation of the machine. The leakage path provided in parallel with the machine circuit across the middle section of the rectifier serves an important function in the operation of the circuit.

Figure 30:
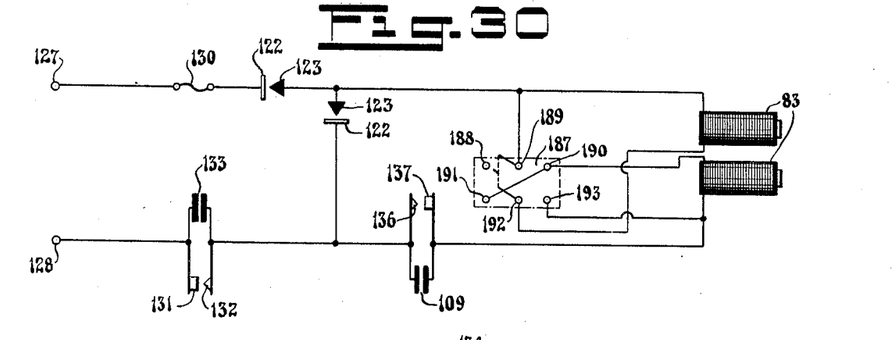
Figure 30 is a schematic diagram of an alternative half-wave rectifier and key punch circuit for A. C. or D. C. operation, using only 20 rectifying junctions.

In Figure 30 I have shown an alternative circuit for half wave rectification in which only two sections of a rectifier assembly are used, each section comprising ten discs or junctions. It will be understood that each of the sections 122, 123 is arranged similarly to those already described in Figures 12 and 29, except that they are of ten junctions each. This circuit is identical with those already described in connection with Figures 12, 13, 14 and 15 except for the arrangement of the rectifier and the provision of a double-pole, double-throw switch 187. In this case when D. C. current is used the positive terminal must be applied to terminal 128. The contacts are the same as above described, that is both contacts 131, 132 and 136, 137 are opened by the magnet 83 upon its operation. The double-pole, double-throw switch 187 has two terminals 188, 191 which are closed for D. C. operation by throwing the switch to the left and connecting contact 189 with 188 and contact 192 with 191. This causes the coils of the magnet 83 to be arranged in series. This arrangement is provided due to the fact that the voltage applied to the magnet coils for D. C. operation with this circuit is double that applied to the magnet coils when operating from A. C. When operating from A. C. the poles in the switch 187 are closed to the right to make contact between terminals 189 and 190 and between 192 and 193. This causes the magnet coils to be arranged in parallel.

Figure 31:
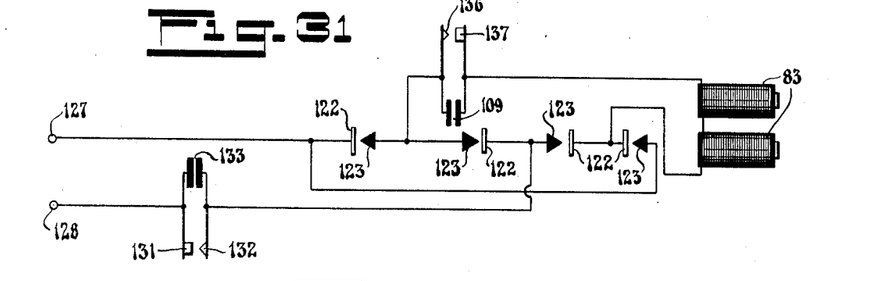
Figure 31 is a schematic diagram of an alternative full-wave rectifier and key punch circuit using only 32 junctions.

In Figure 31 I have shown an alternative full wave rectifier and circuit for key punch which is the one I now prefer. In this circuit the rectifier consists of four sections of 8 junctions each or a total of 32 junctions. The junctions are assembled similarly to Figures 12 and 29 with the direction of current flow indicated by the direction of arrow points as in Figures 13 and 15. The contacts 132, 133 and 136, 137 again are opened by the operation of the magnet 83. In this case the coils of the magnet are arranged permanently in series as the output voltage is approximately the same for A. C. or D. C. operation. With this circuit it is therefore unnecessary to provide a switch for changing the arrangement of the magnet windings. When using D. C. the plug may be inserted with any polarity as there is no difference in operation whether the positive terminal of the current source is applied to terminal 127 or terminal 128. Also with this circuit it is not necessary to use the 250 ohm resistor across the machine circuit. It will be noted that the arrangement of this circuit is the familiar bridge arrangement of the prior art. I therefore believe that the feature of importance in connection with this circuit is the provision of means for opening the contacts 132, 133 and 136, 137 by the magnets 83 so that these contacts are closed only during very brief intervals. This provides an improved operating characteristic which permits the use of only 32 junctions instead of the usual 110 junctions, and therefore makes it possible to mount such a rectifier assembly in the base of the present types of key punches with only a slight increase in weight and no change in the present design, as this rectifier assembly will fit into the space in the base which is not now occupied.

Figure 32:
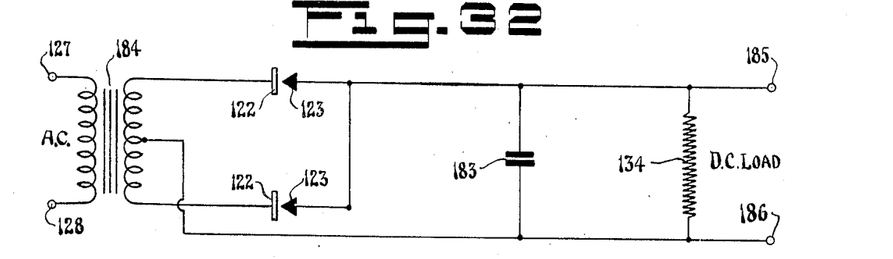
Figure 32 is a schematic diagram of an alternative full-wave rectifier and key punch circuit, using only 30 junctions.
Figure 33:
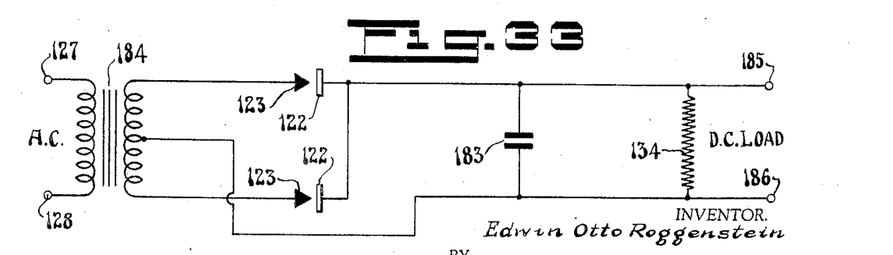
Figure 33 is another arrangement of the rectifier of Figure 32 with the direction of rectification reversed.

In Figures 32 and 33 I have shown two alternative circuits of full wave rectifiers for operating from an A. C. source. In these cases the rectifiers consist of two sections of 15 junctions each, or a total of 30 junctions for the production of sufficient voltage for operating the key punch; or I may employ two sections of 10 junctions each, or a total of 20 junctions with 50 volts across the secondary of the transformer 184 to produce a 25 volt D. C. output for operation of an automatic bookkeeping machine. In the case of these two figures I connect a transformer 184 to the input terminals 127, 128. The rectifier assembly is connected to the secondary of the transformer as indicated in the figures. I also employ a 250 ohm resistor 134, and for an automatic bookkeeping machine a 6 microfarad condenser 183. This condenser is used to filter out the wave shape which must be of good quality to operate the bookkeeping machine. When using this circuit for a key punch the machine circuit will be connected across the terminals marked D. C. load, and the contacts will be arranged as before with one pair in the transformer primary circuit, and the other pair in the machine circuit.

In Figure 32 the positive side of the secondary circuit is from the mid tap of the secondary of transformer 184 through the machine circuit and back to one side or the other of the secondary of the transformer, depending upon which side of the secondary is of negative polarity with respect to the mid tap at any instant.

In Figure 33 the connections are exactly reversed, the ends of the secondary of the transformer 184 serving as the positive end of the circuit, and the negative return being to the mid tap of the secondary of the transformer.

From the above description it will be apparent that this invention resides in certain principles of construction and operation as illustrated in the drawings. It is recognized that those skilled in the art may readily vary the application of these principles and the structure by which they are applied without departure from the scope of this invention. I do not, therefore, desire to be strictly limited to the disclosure as given for purposes of illustration, but rather to the scope of the appended claims.

What is claimed is:

1. A portable electric key punch, a dry rectifier, and circuit connections whereby said punch may be operated from alternating or direct current.

2. An electric key punch, an electrical circuit for said punch consisting of a power circuit and a machine circuit, contacts in each circuit, a magnet for operating said punch, means responsive to a punching operation for closing said contacts simultaneously, and means responsive to the operation of said magnet for opening said contacts simultaneously.

3. An electric key punch comprising two pairs of simultaneously operating contacts for opening and closing the machine circuit and the power circuit.

4. An electric key punch comprising a magnet, an armature for said magnet, two pairs of contacts, means for closing said pairs of contacts, and means responsive to said armature for opening said pairs of contacts.

5. A dry rectifier assembly comprising three sections of rectifier discs, the outer sections so stacked as to pass current in one direction and the intermediate section so stacked as to pass current in the opposite direction.

6. A rectifier assembly comprising a plurality of rectifier discs of the copper oxide type, a plurality of said discs being arranged to pass current in one direction and a plurality of said discs being arranged to pass current in the opposite direction, and an operating circuit connected across one of said plurality of discs.

7. A dry rectifier assembly comprising a plurality of discs so stacked as to pass current in one direction, and a second plurality of discs so stacked as to pass current in the opposite direction, means for supplying current to said rectifier, and an operating circuit connected across said second plurality of discs.

8. An electric key punch, a dry rectifier, a source of alternating or direct current, and an operating circuit for said punch connected to said rectifier.

9. An electric key punch comprising a dry rectifier, a source of alternating or direct current connected across said rectifier, and an operating circuit for said punch connected across a portion of said rectifier.

10. A dry rectifier comprising thirty unilaterally conductive discs arranged in three sections, the two outer sections of ten discs each so stacked as to pass current in one direction and the intermediate section of ten discs so stacked as to pass current in the opposite direction.

11. A dry rectified comprising a plurality of discs stacked under pressure, a conductive contact disc at one end of said rectifier, a portion of said discs mounted adjacent said contact disc to pass current in one direction, a second conductive disc, a portion of said discs arranged to pass current in the opposite direction, a third conductive disc, the last portion of said discs arranged to pass current in the first direction, and a fourth conductive disc.

12. An electric key punch for operation from alternating or direct current comprising a source of power current, a dry rectifier connected across said source, a pair of contacts in circuit between said source and said rectifier, an operating circuit for said punch connected across a portion of said rectifier, a pair of contacts in said operating circuit, and means responsive to the operation of said punch for making and breaking both said pairs of contacts simultaneously.

13. An electric key punch comprising a power circuit, a dry rectifier connected across said power circuit, a portion of said rectifier so arranged as to pass current in the opposite direction from the remainder of said rectifier, and a resistance connected across said portion.

14. An electric key punch comprising a power circuit, a dry rectifier connected across said power circuit, a portion of said rectifier so arranged as to pass current in the opposite direction from the remainder of said rectifier, a resistance connected across said portion, and an operating circuit for said punch connected across said resistance.

15. An electric key punch comprising a power circuit, a dry rectifier connected across said power circuit, a portion of said rectifier so arranged as to pass current in the opposite direction from the remainder of said rectifier, a resistance connected across said portion, an operating circuit for said punch connected across said resistance, a pair of contacts in said power circuit, a pair of contacts in said operating circuit, and means for operating both said pairs of contacts simultaneously.

16. An electric key punch for operating from alternating or direct current comprising a dry rectifier having two sections arranged to pass current in one direction and a third section arranged to pass current in the opposite direction, and a resistance connected across said third section, the operating circuit of said punch being connected across said resistance.

17. An electric key punch for operation from alternating or direct current comprising a dry rectifier having a section arranged to pass current in one direction, an insulating disc next to said section, a second section arranged to pass current in the opposite direction, a third section arranged to pass current in the same direction as the first section, and an operating circuit comprising a switch whereby for direct current operation said rectifier is short-circuited and for alternating current operation said insulating disc is short-circuited.

18. An electric key punch comprising a half wave rectifier, and means for operating said punch from said rectified pulses of current.

19. An electric key punch, and means for operating said punch by intermittent pulses of electric current.

20. An electric key punch comprising a source of alternating or direct current, a rectifier, means responsive to the operation of a key of said punch for causing said rectifier to pass pulses of current, and means responsive to said pulses of current for operating said punch.

21. An electric key punch comprising a source of alternating or direct current, a rectifier, means responsive to the operation of a key of said punch for causing said rectifier to pass pulses of current, and means responsive to said pulses of current for operating said punch and breaking the circuit to said source of power.

22. An electric key punch comprising a source of alternating or direct current, a rectifier, means responsive to the operatoin of a key of said punch for causing said rectifier to pass pulses of current, and means responsive to said pulses of current for operating said punch and breaking the operating circuit.

23. An electric key punch comprising a source of alternating or direct current, a rectifier, means responsive to the operation of a key of said punch for causing said rectifier to pass pulses of current, and means responsive to said pulses of current for operating said punch and breaking said power and operating circuits.

24. A portable electric key punch, and means for operating said punch from an alternating current source.

25. A portable electric key punch comprising a dry rectifier containing not more than thirty-two junctions and an electrical circuit whereby said punch may be operated from alternating current.

26. An electric key punch comprising a dry rectifier having not more than thirty-two rectifier discs.

27. An electric key punch comprising a source of alternating current, a transformer, a dry rectifier connected across the secondary of said transformer, said rectifier comprising a portion having a plurality of discs arranged to pass current in one direction and a portion having a plurality of discs arranged to pass current in the opposite direction, and a machine circuit for said punch connected across the point connecting said rectifier portions and the midpoint of said transformer secondary.

28. In an electric key punch, a dry rectifier for supplying power for operating the punches, and a load circuit for the said rectifier, said load circuit comprising the punch operating means and a second dry rectifier in parallel, said second rectifier being adapted to pass current in the direction opposite to that of the first.

29. In an electric key punch, a dry rectifier for supplying power for operating the punches, and means for lessening the voltage drop from no load to full load condition, said means comprising a second rectifier in parallel with the punch operating means, said second rectifier being connected to pass current in the direction opposite to that of the first rectifier.

EDWIN OTTO ROGGENSTEIN.